United States Patent [19]

Butkus

[11] Patent Number: 4,946,487
[45] Date of Patent: Aug. 7, 1990

[54] HIGH TEMPERATURE FILTER

[75] Inventor: Anthony K. Butkus, Worcester, Mass.

[73] Assignee: Norton Company, Worcester, Mass.

[21] Appl. No.: 271,459

[22] Filed: Nov. 14, 1988

[51] Int. Cl.$^5$ .............................................. B01D 46/00
[52] U.S. Cl. ........................................ 55/523; 55/524
[58] Field of Search ............... 55/523, 524; 210/510.1; 428/446, 698

[56] References Cited

U.S. PATENT DOCUMENTS

| 2,928,733 | 3/1960 | Wagner | 75/221 |
| 3,248,183 | 4/1966 | Powell et al. | 29/182 |
| 3,353,982 | 11/1967 | Blahs | 117/8 |
| 4,264,346 | 4/1981 | Mann | 55/523 |
| 4,278,544 | 7/1981 | Takashima | 210/503 |
| 4,281,512 | 8/1981 | Mills | 60/311 |
| 4,283,207 | 8/1981 | Martyniuk | 55/282 |
| 4,363,644 | 12/1982 | Sato et al. | 55/523 |
| 4,560,478 | 12/1982 | Narumiya | 210/496 |
| 4,599,320 | 7/1986 | Reeve et al. | 501/96 |
| 4,632,683 | 12/1986 | Fukutani et al. | 55/523 |
| 4,690,763 | 9/1987 | Rieger et al. | 210/510.1 |
| 4,692,176 | 9/1987 | Israelson | 55/523 |

FOREIGN PATENT DOCUMENTS 133810  8/1983  Japan ................................ 55/523

Primary Examiner—Bernard Nozick
Attorney, Agent, or Firm—Arthur A. Loiselle, Jr.

[57] ABSTRACT

Filter for hot gases, comprising a mass of grains formed of a ceramic having a high melting temperature and bonded together at contact point by molten power of the same ceramic.

5 Claims, 2 Drawing Sheets

HIGH TEMPERATURE FILTER

BACKGROUND OF THE INVENTION

It is common practice to clean particle-laden gases by passing them through a filter. When the gases have a low temperature, there are many porous materials that serve this purpose satisfactorily. Even when the gas has a higher temperature than the filter can handle, it is possible to cool the gas before filtering it. However, in some applications it is unsatisfactory to cool the gas, because of thermodynamic economy, or simply because it is inconvenient. For instance, in a large trash burning facility, it is desirable to remove particulate before releasing the combustion air to the atmosphere in order to significantly reduce the level of pollution. Cooling before filtering in such a case serves to add resistance to the flow of gas in the system and to add expensive complications.

Another situation in which removal of particles from hot gas would be desirable is in the case of the hot gas from a combustor flowing to a gas turbine; the particles in the gas tend to clog and to cause erosion on the turbine blades; further, the subsequent effluent from the turbine contributes to pollution. In this case, cooling the gas would upset the thermodynamic efficiency of the turbine, since the proper operation of a heat power machine requires as hot a gas as possible.

In order for a filter to be appropriate for the temperatures above 1,000° C. (1,832° F.) encountered in these two applications, it must have a number of fairly unusual properties. Besides being used at atmospheric pressure and high flow rates, the filter must be physically strong to be utilized in applications of high pressure with possible pressure differentials up to 400 pounds per square inch.

First of all, it must be physically strong, because the high volumes of gas which must pass through the filter will probably create sufficient force to impose significant mechanical strain on the filter.

Second, the filter must have a pore structure of effective diameter which can be set to a specific quantity and held to a very narrow range. Each application of the filter would require a specific effective diameter in order to optimize results and it is necessary that that specific diameter be essentially uniform and within very narrow tolerances across the entire filter. Otherwise, the filter will not efficiently carry out its filtering function with minimum resistance to flow. Finally (and most importantly), all of the qualities of this filter must be maintainable even if the filter is exposed to a very high temperature. For instance, in the normal range of 1,000° C. (1,832° F.) and at least as high as 1,500° C. (1,832°) and in either oxidizing, reducing or neutral atmospheric conditions.

Since most filter materials melt at temperatures substantially below this range, the only substance available is ceramic and attempts have been made to construct high temperature filters from such material. In the past, ceramic materials in the form of crushed aggregate have been used, but it has been difficult to obtain consistent or selected pore sizes. Bonding between particles, has been less than adequate, thus contributing to structural weakness. These and other difficulties experienced with the prior art devices have been obviated in a novel manner by the present invention.

It is, therefore, an outstanding object of the invention to provide a filter having characteristics that permit operation with gases at temperatures over 1,000° C., (1,832°).

Another object of this invention is the provision of a filter having exceptional structural strength at high temperatures.

A further object of the present invention is the provision of a high temperature filter having consistent pore size throughout.

It is another object of the invention to provide a high temperature filter having a selected pore size within extremely narrow tolerance.

A still further object of the invention is the provision of a filter for use with hot gases, which filter is simple in construction, which can be easily manufactured from relatively inexpensive materials, and which is capable of a long life of service without replacement.

It is a further object of the invention to provide a filter having a structure that is capable of withstanding a severe treatment for the removal of accumulated particulate without damage.

With these and other objects in view, as will be apparent to those skilled in the art, the invention resides in the combination of parts set forth in the specification and covered by the claims appended hereto.

SUMMARY OF THE INVENTION

In general, the invention has to do with a filter for removing particles from hot gases, the filter having a main body composed of a large number of grains of a ceramic or refractory material in a tightly-packed mass, the grains being formed of a ceramic having a high melting temperature and of uniform selected size, so that the grains engage one another at contact points to form uniform passages of a selected size. A small amount of binder is located at each contact point, the binder preferably consists of the same ceramic as the grains and the filter being free of organic binder.

In addition, the invention consists of a process for forming a filter for removing particles from hot gases, comprising the steps of preparing a mass of grains of uniform size formed of a ceramic having a high melting temperature, forming a mixture of the grains with a fine powder of the same ceramic and with a temporary organic binder, forming the mixture into a main body in which the grains are tightly packed to provide contact points between adjacent grains, pressing the main body to form a greenware, and sintering the main body at a temperature close to the melting temperature of the ceramic to burn off the organic binder and to cause the fine powder to melt and form a binder between the grains at the contact points. More specifically, some of the binder is formed during sintering from a fine powder of the ceramic, and some of the binder is formed during sintering from a powder of the metallic element in the ceramic and carbon generated by the organic binder to form the same ceramic. The ceramic is silicon carbide, the metallic element is silicon, and the portion of the organic binder is carbon.

Figure 1:
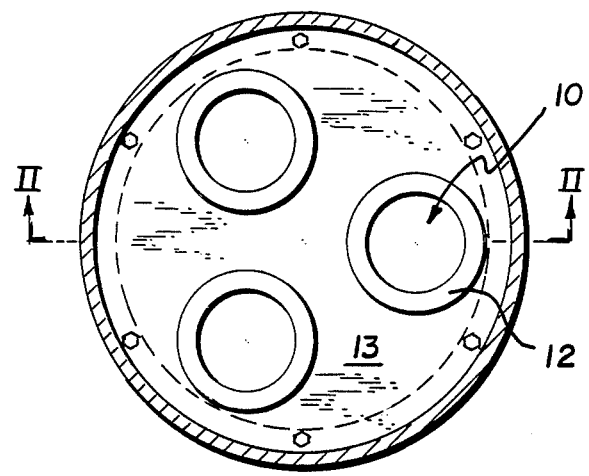
FIG. 1 is a plan view of a filter incorporating the principles of the present invention, shown in use in a filter apparatus.
Figure 2:
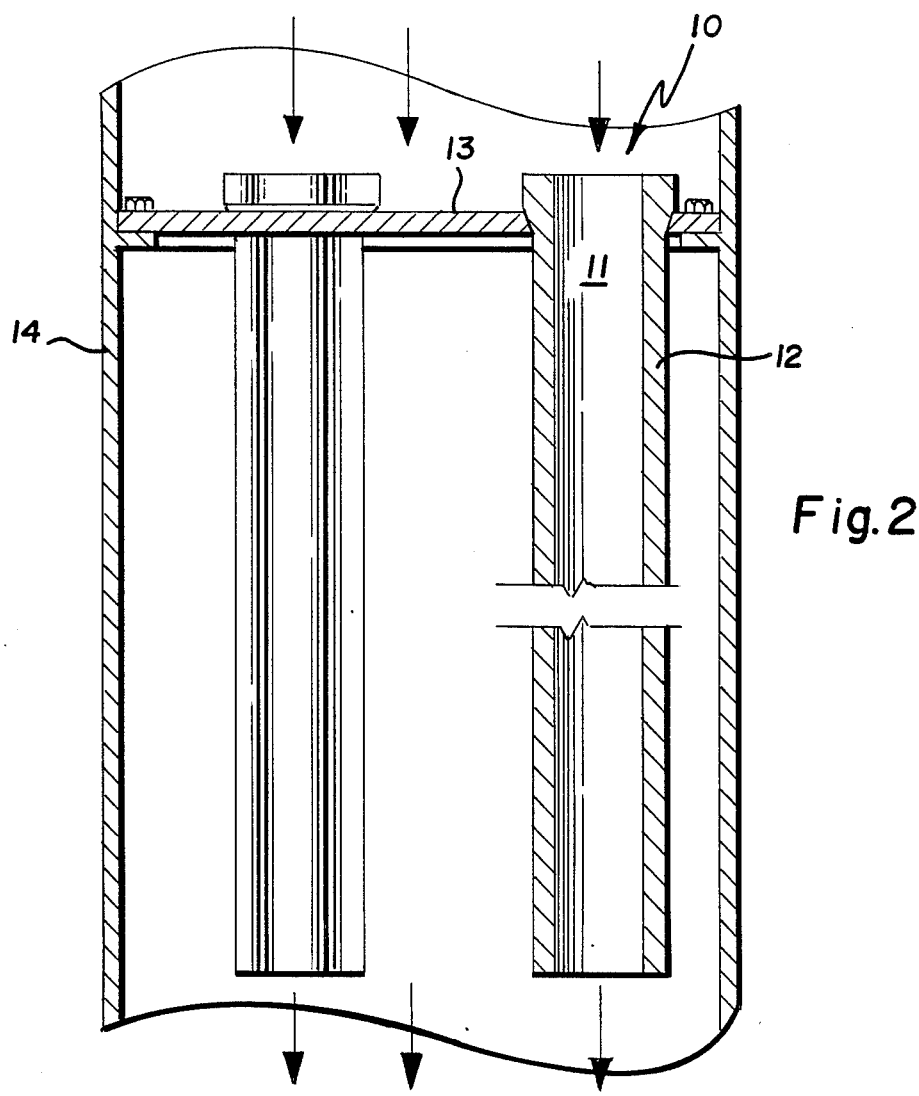
FIG. 2 is a vertical sectional view of the invention taken at the line II—II of FIG. 1.

Referring first to FIGS. 1 and 2, which best show the general features of the invention, the filter, indicated generally by the reference numeral 10, is shown as carried in a tubular candle 12. The candle (along with two other candles and filters) is supported in a mounting plate 13. The plate is mounted in a conduit 14 which carries a flow of particle-laden gas emitted, for instance, from the combustor of a gas turbine (not shown).

Figure 3:
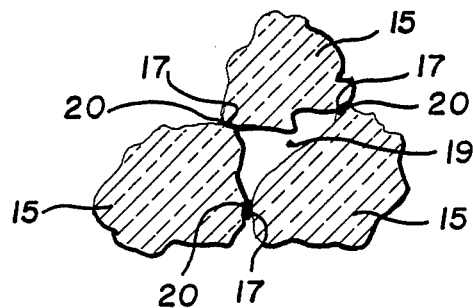
FIG. 3 is a greatly enlarged sectional view of a portion of the filter.

The filter 10 consists of a main body 11 which is made up of a mass of ceramic grains 15 (FIG. 3) sintered together, using a bond which is capable of tolerating high temperatures. In the preferred embodiment, the filter 10 is formed by the sintering together of a mass of silicon carbide grains or particles using a bond which is capable of tolerating high temperatures. By choosing a particular starting size of the silicon carbide particles a specific effective pore diameter (which is a function of the starting particle size) results from the process. The resulting filter has that specific pore diameter within very narrow tolerances across the entire surface of the filter.

The process begins by preparing a silicon carbide mass in which each particle is of a relatively uniform size and contains no fines. The size is chosen to result in a specific effective diameter of pore size in the final filter product. This is because the particles of relatively uniform diameter will form relatively uniform spaces between one another if they are allowed to be formed in a closely packed mass. Because silicon carbide is very hard and is capable of tolerating very high temperatures, this uniform pore structure is not destroyed by the processing which will be discussed below.

Before actually forming the filter, the silicon carbide particles (for example, having a size of No. 90 grit U.S. standard sieve series) (about 1,500 microns diameter), are coated with 2.86 wt. percent of organic adhesive. To the resulting mass is added 17.4 wt. percent of fine (3 micron diameter) silicon carbide dust which will form the bond between the larger particles when the filter is sintered. The mass also includes a small amount of silicon metal which will later combine with the carbon from the 2.86 wt. percent of organic adhesive when it burns, to form a small amount of silicon carbide reaction product. The resulting mass is then pressed into a filter shape at 3 tons per square inch and the resulting "greenware" is fired in a furnace at 2,400° C. in an argon atmosphere to carbonize the organic adhesive. Some of the organic matter will combine with the silicon to form silicon carbide. The firing acts to sinter the fine silicon carbide to bind the large silicon carbide particles where they touch one another. The resulting filter will typically have a density of 1.95 grams/cc, an overall pore range from 5 to 23 microns, with the majority of pores between 9 to 18 microns, an average pore radius of 14 microns and a volume percent pores of 40%.

Speaking generally, this invention involves forming a filter element for removing particles from high temperature gas streams by bonding together uniform diameter large and hard particles with a fine binder of the high temperature material. The bond at the contacts between the large particles is not destroyed by high temperature during the filtering. It can be seen, then, that the filter 10 comprises a main body 11 composed of a large number of grains 15 in a tightly-packed mass, the grains being formed of a ceramic having a high melting temperature and of uniform selected size, so that the grains engage one another at contact points 17 to form uniform passages 19 of a selected size. A small amount of binder is located at each contact point, the binder 20 consisting of the same ceramic as the grains, the filter being free of organic binder. Some of the binder 20 is formed during sintering from a fine powder of the ceramic, and some of the binder is formed during sintering from a powder of the metallic element in the ceramic and a portion of organic binder to form the same ceramic. In the preferred embodiment, the ceramic is silicon carbide, the metallic element is silicon, and the portion of the organic binder is carbon.

Figure 4:
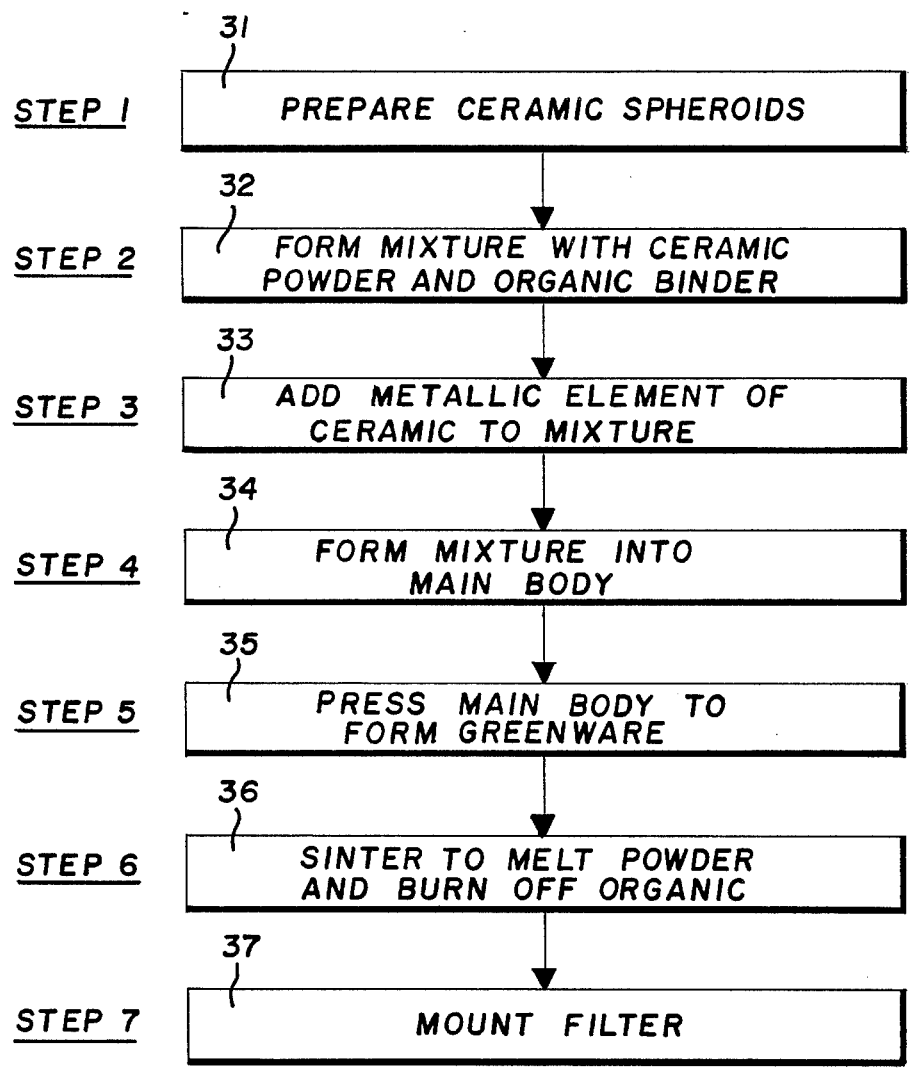
FIG. 4 is a flow chart showing the steps of a process for manufacturing the filter.

Referring to FIG. 4, the process for forming a filter for removing particles from hot gases consists of:

A first step 31 of preparing a mass of grains 15 of relatively uniform size formed of a ceramic having a high melting temperature, A second step 32 of forming a mixture of the grains with a fine powder of the ceramic and an organic binder, A third step 33 of adding to the mixture, the metallic element of the ceramic in the form of powder, A fourth step 34 of forming the mixture into the main body 11 in which the grains 15 are tightly packed to provide contact points 17 between adjacent grains, A fifth step 35 in which the main body is pressed to form a greenware, A sixth step 36 in which the main body is sintered at a temperature close to the melting temperature of the ceramic to burn off the organic binder and to cause the fine powder to melt and form a binder between the grains at the contact points, and A seventh step 37 of maintaining the filter 10 in the candle 12.

The operation and advantages of the invention will be readily understood in view of the above discussion. During use, dust-laden hot gases in the range from 1,000° C. to 1,500° C. (1,832° F. to 2,732° F.) will flow through the conduit 14 from a source, which may be a combustor for a gas turbine or the discharge from a trash burning furnace. The gas approaches the candles 12 and enters the filters 10. As the gas passes through the passages 19 between the refractory grains 15, the particles of dust or other detritus accumulates on the surfaces of the grains and in the "nooks and crannies" of the mass of grains.

It can be seen, then, that the present invention has the desired properties necessary for operation in the hot gas environment. First of all, it is physically strong, because the high volumes of gas which must pass through the filter will probably create sufficient force to impose significant strain on the filter.

Secondly, the filter has a pore structure of effective diameter which can be set to a specific quantity and held to a very narrow range. Each application of the filter would require the specific effective diameter that is necessary in order to optimize results. It is also necessary that that specific diameter be essentially uniform within very narrow tolerances across the entire filter. Otherwise, the filter will not efficiently carry out its filtering function with minimum resistance to flow. Finally, and most importantly, all of the qualities of this filter are maintainable even if the filter is exposed to very high temperatures, for instance, in the normal range of 1,000° C. (2,732° F.).

In a practical embodiment of the invention, the mixture consisted of:

|  | Percent |
| --- | --- |
| 90 grit SiC grains | 82.6 |
| Dextrin | 1.5 |
| 3 micron SiC | 17.4 |
| Swift's colloid | 2.86 |
| Silicon metal | .5 |

The greenware was pressed at 3 tons per inch and fired at 2,400° C. in argon. The filter which was thus formed had a density of 1.95 g/cc, on average pore radius of 14 microns, and volume percent pores of 40%.

Another filter was made from 45 grit silicon carbide grain in a formation process as explained above which yielded a filter with a density of 2.06 grams per cc, pores ranging from 8 to 120 microns and an average pore size of 58 microns, and a volume percent pores of 36%.

In addition to silicon carbide (SiC) particles, this invention has been made with grains of fused alumina ($Al_2O_3$), chrome oxide $Cr_2O_3.Al_2O_3$, and fired in an oxidizing atmosphere to a temperature that promoted significant recrystallization of fines for the bond.

It may be desirable in some situation to add a pore-inducing medium to the mix, such medium including crushed walnut shells, sawdust, paradichlorobenzene, or polypropylene powder, etc.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Filter for removing particles from hot gases comprising:
   (a) a main body composed of a large number of grains in a tightly-packed mass, the grains being formed of a ceramic having a high melting temperature and of relatively uniform selected size, so that the grains engage one another at contact points to form uniform passages of a selected size, and
   (b) a small amount of binder located at each contact point, the binder consisting of the same ceramic as the grains, the filter being free of organic binder, wherein some of the binder is formed in situ during sintering by reaction of a fine powder of a metallic element of the same ceramic and carbon of an organic binder.

2. Filter as recited in claim 1, wherein the ceramic is silicon carbide, wherein the metallic element is silicon, and wherein the said portion of the organic binder is carbon.

3. Filter as recited in claim 1, wherein the ceramic is selected from the class consisting of silicon carbide, fused alumina particles, chrome oxide, chrome magnesia, and chrome alumina, and wherein the body is fired in an oxidizing atmosphere to a temperature that promotes significant recrystallization of fines for the bond.

4. Filter as recited in claim 1, wherein the ceramic is silicon carbide, and wherein the body is fired in a suitable atmosphere to a temperature that promotes significant recrystallization of fines for the bond.

5. Filter for removing particles from hot gases comprising;
   (a) a main body composed of a large number of grains in a tightly-packed mass, the grains being formed of a ceramic having a high melting temperature and of relatively uniform selected size, in the range from 45 to 90 grit, so that the grains engage one another at contact points to form uniform passages of a selected size,
   (b) a small amount of binder located at each contact point, the binder consisting of the same ceramic as the grains, the filter being free of organic binder, wherein some of the binder is formed during sintering from a fine powder of the ceramic, wherein some of the binder is formed during sintering from a powder of metallic element of the ceramic and a portion of organic binder to form the same ceramic, wherein the ceramic is silicon carbide, wherein the metallic element is silicon, and wherein said portion of the organic binder is carbon.

* * * * *